(12) United States Patent
Nomura et al.

(10) Patent No.: US 7,040,430 B2
(45) Date of Patent: May 9, 2006

(54) COGENERATION VEHICLE SYSTEM UTILIZING A FUEL CELL CAR AND A MOBILE UNIT AS A COMPONENT OF THE SYSTEM

(75) Inventors: Noboru Nomura, Kyoto (JP); Takashi Fukunaga, Zama (JP); Jiro Suzuki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 169 days.

(21) Appl. No.: 10/368,365

(22) Filed: Feb. 20, 2003

(65) Prior Publication Data

US 2003/0155160 A1    Aug. 21, 2003

(30) Foreign Application Priority Data

Feb. 21, 2002    (JP)    ............... 2002-045389

(51) Int. Cl.
*B60K 1/00*    (2006.01)
(52) U.S. Cl. .................... 180/65.1; 180/53.5
(58) Field of Classification Search ........... 180/65.1, 180/65.2, 53.5
See application file for complete search history.

(56) References Cited

U.S. PATENT DOCUMENTS

| | | | |
|---|---|---|---|
| 4,414,462 A * | 11/1983 | Price ............ | 219/202 |
| 4,489,242 A * | 12/1984 | Worst ............ | 307/10.1 |
| 5,678,410 A * | 10/1997 | Fujita et al. ............ | 62/7 |
| 5,692,459 A * | 12/1997 | Richardson, Jr. ............ | 123/3 |
| 6,107,691 A * | 8/2000 | Gore et al. ............ | 290/1 R |
| 6,193,003 B1 * | 2/2001 | Dempster ............ | 180/180 |
| 6,290,014 B1 * | 9/2001 | MacCready, Jr. ............ | 180/205 |
| 6,516,925 B1 * | 2/2003 | Napier et al. ............ | 188/112 A |
| 6,571,542 B1 * | 6/2003 | Fillman et al. ............ | 56/10.6 |
| 6,729,114 B1 * | 5/2004 | Fillman et al. ............ | 56/10.6 |

FOREIGN PATENT DOCUMENTS

JP    8-273680    10/1996

* cited by examiner

*Primary Examiner*—Christopher P. Ellis
*Assistant Examiner*—Bridget Avery
(74) *Attorney, Agent, or Firm*—Wenderoth, Lind & Ponack, L.L.P.

(57) ABSTRACT

There is provided a vehicle system, including an electromobile having a fuel cell power generator mounted therein, and a predetermined mobile unit jointable to the electromobile, such that cogeneration within the mobile unit can be realized even during the travel of the electromobile. Via a joint section 30, a vehicle 10 including a fuel cell 13 as a source of motive power is jointed to a mobile unit 20 capable of travelling and at least including a storage battery 23 and a water tank 25. The water produced in the fuel cell 13 is recovered by a water recovery section 21 via the joint section 30. The heat produced in the fuel cell 13 is recovered by a heat recovery section 22 via the joint section 30. The recovered water is warmed up with the recovered heat, and thereafter stored in the water tank 25. The hot water stored in the water tank 25 is utilized as hot water to be used for controlling the temperature of the mobile unit 20 or supplied as hot water. Any excess electric power generated by the fuel cell 13 is stored in the storage battery 23, and supplied onto electric wiring within the mobile unit 20.

14 Claims, 3 Drawing Sheets

COGENERATION VEHICLE SYSTEM UTILIZING A FUEL CELL CAR AND A MOBILE UNIT AS A COMPONENT OF THE SYSTEM

BACKGROUND OF THE INVENTION

1. Field of the Invention

The present invention relates to a cogeneration vehicle system utilizing a fuel cell car, and to a mobile unit which constitutes a component of the system. More particularly, the present invention relates to a cogeneration vehicle system and a mobile unit which permit water and heat, generated at the time of power generation in a fuel cell car, to be effectively utilized in a mobile unit (e.g., a trailer) which is jointed to the fuel cell car, or in an immobile facility (e.g., a residential house) by way of such a mobile unit.

2. Description of the Background Art

In recent years, fuel cell-based power generators have been attracting attention since such power generators have a high energy efficiency and yet are environmentally friendly. Power generation by a fuel cell occurs through a reaction which is a reversal of electrolysis of water, where hydrogen and oxygen are reacted to generate power. Therefore, the resulting by-products from power generation by a fuel cell are water and heat. No harmful gases, such as nitrogen oxides, are emitted as a result of power generation by a fuel cell (note that extremely small amounts of harmful gases may be emitted from some types of fuel cells).

Various types of fuel cells have been developed and studied. Among others, a fuel cell in solid polymer form has a higher energy efficiency than that of other types of fuel cells, and produces little carbon dioxide gas, resulting in less unfavorable impact on the environment. Moreover, a fuel cell of solid polymer form can operate at a lower temperature (about 70° C.) than other types of fuel cells, thereby allowing for an easy adjustment of the amount of generated power.

Therefore, there are expectations for utilizing fuel cells of solid polymer form as alternative sources of motive power in automobiles (to replace conventional internal combustion engines), or as cogeneration energy sources to be used in dwelling or accommodation facilities (e.g., residential houses or trailer houses).

However, in the case where fuel cells are to be used as a source of motive power for an electromobile and as a cogeneration system in a residential house or the like, a power generator incorporating a fuel cell must be installed at each of the electromobile and the residential house or the like, thereby resulting in a high installation cost. Moreover, while it may be possible in the residential house or the like to effectively utilize substantially all of the water and heat which are produced through power generation by the fuel cell, the electromobile will only use the generated electric power and discard the generated water and heat, so that optimum use of energy is not attained in the electromobile.

Accordingly, techniques for utilizing the water and heat generated by a fuel cell power generator mounted in an electromobile for indoor/outdoor cogeneration purposes have been proposed in Japanese Patent Laid-Open Publication No. 8-273680, for example. In this conventional technique, an electromobile having a fuel cell power generator mounted therein is connected to a housing or a tent, so as to allow the electric power, water, and heat which are produced through the fuel cell power generation in the electromobile to be supplied to the housing or tent.

However, the conventional technique utilizes the electromobile incorporating the fuel cell power generator as an immobile power generator (i.e., a power generator which is fixed in place). Therefore, the inherent travelling capabilities of the automobile cannot be exerted during power generation. On the other hand, cogeneration can no longer be realized once the automobile is disconnected from the housing or tent in order to allow the automobile to travel.

Thus, the conventional technique has problems which are difficult to reconcile.

SUMMARY OF THE INVENTION

Therefore, an object of the present invention is to provide a vehicle system comprising an electromobile having a fuel cell power generator mounted therein and a mobile unit to be jointed to the electromobile, the mobile unit being capable of moving and at least comprising a storage battery and a water tank, such that the system realizes cogeneration, not only while the electromobile is stopping but also while the electromobile is moving, by allowing the fuel cell mounted in the electromobile to work in cooperation with the storage battery and water tank provided in the mobile unit.

The present invention has the following features to attain the above object.

A first aspect of the present invention is directed to a cogeneration vehicle system using a fuel cell car, comprising: a vehicle including a fuel cell for generating electric power by using hydrogen as a fuel and a hydrogen supply section for storing the hydrogen fuel; and a mobile unit including a space and equipment to be used by a user, the mobile unit being jointed to the vehicle so as to be capable of traveling while being trailed by and exchanging energy with the vehicle. The mobile unit further includes: a heat storing section for recovering heat produced through the power generation by the fuel cell from the vehicle, heating predetermined water with the recovered heat, and storing the heated predetermined water in a water tank; and an electricity storing section for recovering, from the vehicle, excess electric power which is generated through the power generation by the fuel cell but not needed for running the vehicle, and storing the excess electric power in a storage battery. The energy which is generated by the fuel cell but not used for running the vehicle is stored in the mobile unit, and used by the equipment in the mobile unit.

Thus, according to the first aspect, the vehicle including a fuel cell power generator and the mobile unit can be jointed so as to work in cooperation and move together. As a result, the energy which is generated by the fuel cell but not used for running the vehicle can be effectively used for cogeneration in the mobile unit, even during the travel of the vehicle. Thus, the system according to the first aspect provides a higher cogeneration efficiency than conventional systems, and is low-pollution, low-noise, and environmentally friendly. Moreover, cogenerative use of a fuel cell power generator, which has conventionally been possible only within a stationary building, can be realized at any arbitrary destination according to the present invention.

According to a second aspect based on the first aspect, the cogeneration vehicle system further comprises: an immobile facility including a space and equipment to be used by a user, the immobile facility being jointed to the mobile unit so as to be capable of exchanging energy with the mobile unit, wherein the energy stored in the mobile unit is used by the equipment in the immobile facility.

Thus, according to the second aspect, the mobile unit which is jointed to the vehicle can be further jointed to the immobile facility, so that energy can be exchanged between the mobile unit and the immobile facility. Specifically, the energy produced during the travel of the vehicle can be stored in the mobile unit, so as to be later utilized for cogeneration within the immobile facility.

In the system according to the first or second aspect, the heated predetermined water stored in the heat storing section is supplied to hot-water supplying equipment in the mobile unit or the immobile facility, and the electric power stored in the electricity storing section is supplied to electric equipment in the mobile unit or the immobile facility.

Thus, since the mobile unit comprising a storage battery and a water tank can work in cooperation with the vehicle and/or the immobile facility, the heat and excess electric power produced during the travel of the vehicle can be stored in the mobile unit, so as to be effectively used for cogeneration within the mobile unit and/or the immobile facility. Moreover, since the electric power stored in the storage battery of the mobile unit can be used together with the commercial electric power which is available in the immobile facility, it is possible to use the storage battery as a load fluctuation-absorbing power source capable of providing a peak-cut effect, or as an emergency power source in times of power failure. Since the hot water in the water tank of the immobile facility can be supplemented with the water in the water tank of the mobile unit, it is possible to downsize the water tank of the immobile facility.

Preferably, the heat storing section recovers water produced through the power generation by the fuel cell from the vehicle, and uses the water produced as the predetermined water.

Thus, the water produced through the fuel cell power generation in the vehicle can be effectively used for cogeneration within the mobile unit and the immobile facility.

Preferably, if the electric power which is generated through the power generation by the fuel cell is smaller than a level of electric power which is necessary for running the vehicle, the electric power stored in the storage battery in the mobile unit is supplied to the vehicle.

Thus, hybrid running can be realized while the vehicle and the mobile unit are jointed together.

Preferably, if an amount of electric power stored in the storage battery in the mobile unit is equal to or greater than a predetermined level, the electric power stored in the storage battery is supplied to the electric equipment in the immobile facility, and if the amount of electric power stored in the storage battery in the mobile unit is less than the predetermined level, a power source in the immobile facility is used to recharge the storage battery with electric power.

Thus, if the amount of stored power in the storage battery of the mobile unit is not adequate while the mobile unit is jointed to the immobile facility, the storage battery of the mobile unit can be recharged with the commercial electric power which is available in the immobile facility. As a result, the hydrogen fuel consumption by the vehicle can be reduced.

By utilizing the system according to the first or second aspect, in a start sequence of the vehicle, the heat stored in the heat storing section in the mobile unit or in the hot-water supplying equipment in the immobile facility may be used to warm up at least one of the fuel cell in the vehicle or the storage battery in the mobile unit. Furthermore, in a start sequence of the vehicle, the heat stored in the heat storing section in the mobile unit or in the hot-water supplying equipment in the immobile facility may be used to warm up at least one of a window pane, internal air, and a seat of the vehicle.

Thus, by using the hot water in the water tank or the hot-water supplying equipment in the immobile facility for warming up the fuel cell of the vehicle and/or the storage battery of the mobile unit, and/or providing room heating within the vehicle before beginning a travel, a comfortable travelling environment can be provided.

While the vehicle, the mobile unit, and the immobile facility are jointed to one another, the hydrogen fuel for the fuel cell may be supplied from the immobile facility via the mobile unit.

Thus, without having to take the trouble of visiting a predetermined hydrogen supplying station or the like, the hydrogen fuel stored in the vehicle can be supplied from the immobile facility.

Preferably, the vehicle further includes a filter for removing dust and hazardous matter, and supplies oxygen extracted from air which has been passed through the filter to the fuel cell.

Thus, when sufficiently clean hydrogen and oxygen are used as fuels, the water produced by the fuel cell can be used for drinking.

Preferably, when the heated predetermined water stored in the water tank is to be used for drinking, the mobile unit discharges the heated predetermined water out of the mobile unit if the heated predetermined water is cooled to about 50° C. or lower, and when the heated predetermined water stored in the water tank is to be used for a purpose other than drinking, the mobile unit discharges the heated predetermined water out of the mobile unit before the heated predetermined water is cooled to about 0° C.

Thus, decomposition of water or the destruction of the water tank due to freezing of water can be prevented.

Furthermore, the mobile unit may further comprise a heating section for heating the heated predetermined water stored in the water tank by using catalytic combustion of the hydrogen fuel stored in the vehicle.

By employing such a heating section, the hot water at about 40° C. to about 70° C. which is recovered from the fuel cell can be heated to an arbitrary temperature suitable for drinking.

In the cogeneration vehicle system according to the first or second aspect, depending on the user's desired driving pattern, the vehicle and the mobile unit are capable of being freely disjointed from each other. When the vehicle and the mobile unit are disjointed from each other, the vehicle is capable of travelling alone by using the electric power generated by the fuel cell.

In the cogeneration vehicle system according to the second aspect, depending on the user's desired driving pattern, the vehicle, the mobile unit, and the immobile facility are capable of being freely disjointed from one another. When the vehicle and the mobile unit are disjointed from the immobile facility, the vehicle and the mobile unit are capable of travelling while jointed together, wherein the energy which is generated by the fuel cell but not used for running the vehicle is stored in the mobile unit and used as necessary, as is the case with the first aspect.

A third aspect of the present invention is directed to a mobile unit including a space and equipment to be used by a user, the mobile unit being jointable to a vehicle so as to be capable of traveling while being trailed by and exchanging energy with the vehicle, and the mobile unit being jointable to an immobile facility so as to be capable of exchanging energy with the immobile facility, wherein the vehicle includes a fuel cell for generating electric power by using hydrogen as a fuel, and the immobile facility includes a space and equipment to be used by a user, the mobile unit comprising: a heat storing section for storing hot water in a water tank; and an electricity storing section for storing electric power in a storage battery, wherein, when the mobile unit is jointed to the vehicle, the heat storing section recovers heat produced through the power generation by the fuel cell from the vehicle, heats predetermined water with the recovered heat, and stores the heated predetermined water in a water tank, the electricity storing section recovers, from the vehicle, excess electric power which is generated through the power generation by the fuel cell but not needed for running the vehicle, and stores the excess electric power in the storage battery, and the heated predetermined water stored in the heat storing section is supplied to hot-water supplying equipment in the mobile unit, and the electric power stored in the electricity storing section is supplied to electric equipment in the mobile unit; and when the mobile unit is jointed to the immobile facility, the heated predetermined water stored in the heat storing section is supplied to hot-water supplying equipment in the immobile facility, and the electric power stored in the electricity storing section is supplied to electric equipment in the immobile facility.

Preferably, the heat storing section recovers water produced through the power generation by the fuel cell from the vehicle, and uses the water as the predetermined water.

Thus, the water produced through the fuel cell power generation in the vehicle can be effectively used for cogeneration.

Preferably, when the heated predetermined water stored in the water tank is to be used for drinking, the mobile unit discharges the heated predetermined water out of the mobile unit if the heated predetermined water is cooled to about 50° C. or lower, and when the heated predetermined water stored in the water tank is to be used for a purpose other than drinking, the mobile unit discharges the heated predetermined water out of the mobile unit before the heated predetermined water is cooled to about 0° C.

Thus, decomposition of water or the destruction of the water tank due to freezing of water can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

A first embodiment of the present invention will be directed to a cogeneration vehicle system comprising an electromobile having a fuel cell power generator mounted therein (individual cars, taxis, buses, trucks; hereinafter collectively referred to as "vehicles") and a mobile unit to be jointed to the vehicle. A second embodiment of the present invention will illustrate an example of connecting the cogeneration vehicle system according to the first embodiment to an immobile facility (e.g., a residential house or any other building at which the vehicle may come to a stop) so as to realize cogeneration within the immobile facility. A third embodiment of the present invention will illustrate a practical method for utilizing the water and heat which are generated through fuel cell power generation.

FIRST EMBODIMENT

Figure 1:
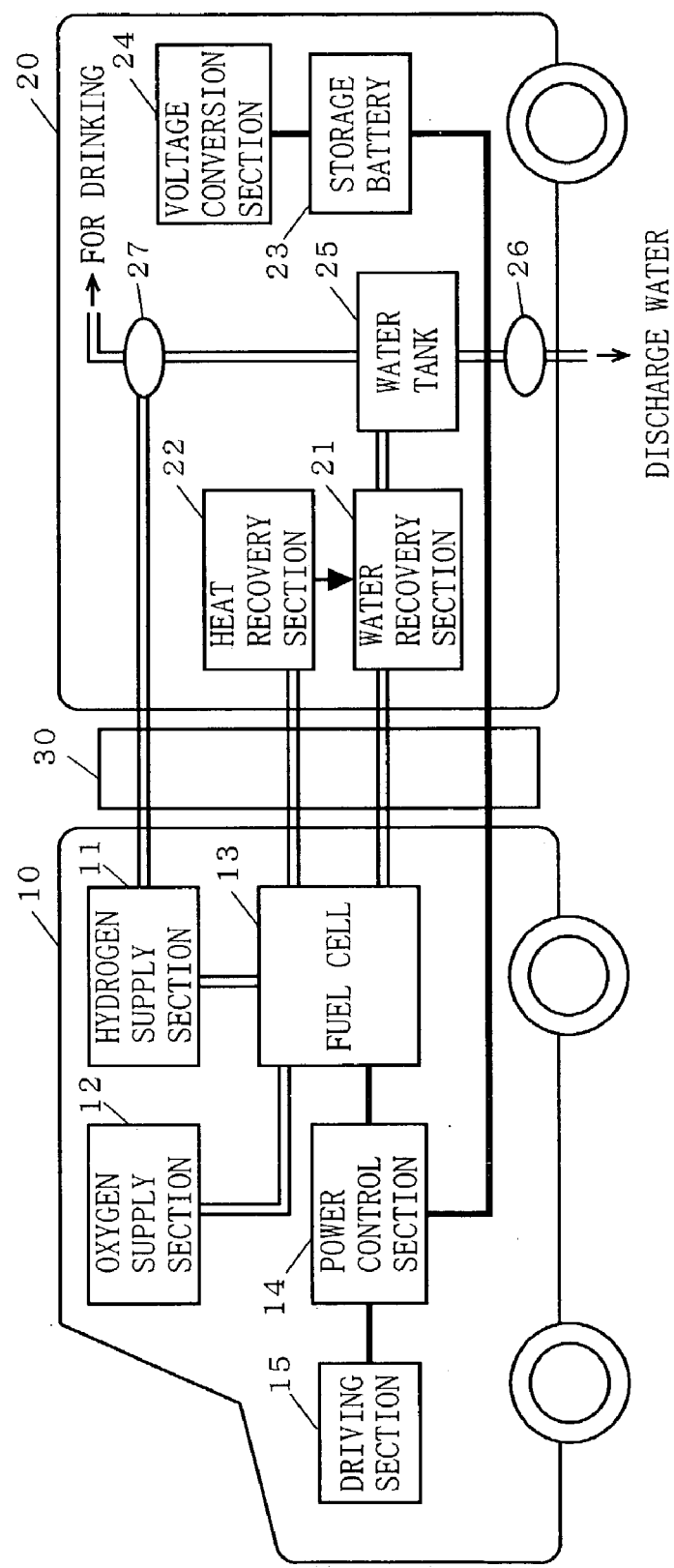
FIG. 1 is a block diagram illustrating the structure of a cogeneration vehicle system according to a first embodiment of the present invention.

FIG. 1 is a block diagram illustrating the structure of a cogeneration vehicle system according to a first embodiment of the present invention. In FIG. 1, the system according to the first embodiment comprises a vehicle 10 incorporating a fuel cell power generator which utilizes hydrogen as a fuel and a mobile unit 20 having a living space. The vehicle 10 and the mobile unit 20 are jointed via a joint section 30. The joint section 30 joints the vehicle 10 and the mobile unit 20 in such a manner that the mobile unit 20 can be trailed by the vehicle 10 and yet energy provided from the vehicle 10 can be used for cogeneration within the mobile unit 20.

The mobile unit 20 illustrated herein is a trailer which can be conveniently moved along with the vehicle 10 and utilized by people. A typical example is a mobile house which includes daily living equipment such as a kitchen, a toilet, beds, and so on. When joined to the vehicle 10, such a mobile unit 20 will function as a so-called trailer house. Other examples of the mobile unit 20 would be trailers which accommodate any of the following spaces.

Amusement-oriented spaces, examples of which include: a "virtual home-communication room" for experiencing virtual reality, and a "hobby room", an "atelier", a "karaoke room", a "theater room", or an "audio room" for enjoying hobbies such as pottery or playing of musical instruments at a given destination. For example, in the case where the mobile unit 20 accommodates an audio room, the mobile unit 20 can be moved to a place where noise would not be a problem, thereby making it possible to enjoy music at a high sound volume level. Utility-oriented spaces, examples of which include: a "lesson room" (for holding lessons on computer literacy, for example), a "study", a "SOHO", a "satellite office", a "kitchen", and a "guest room". Amenity-oriented spaces, examples of which include: a "smart house", a "lounge", a "sitting room", a "crush room", a "living room", and a "bedroom". Heath-oriented spaces, examples of which include: a "recreation cottage", a "recovery room or room for climatotherapy", and a "training gymnasium". Safety-oriented spaces, examples of which include: a "survival assistance room", a "shielding room (for isolating the user from the outside)", and a "refuge". Spaces such as "a disaster shelter", a "long-term isolated living assistance room", and a "care house" would provide peace of mind.

First, the detailed structures of the vehicle 10 and the mobile unit 20 constituting the cogeneration vehicle system according to the first embodiment, and the role of the joint section 30 which joints the vehicle 10 and the mobile unit 20, will be described with reference to FIG. 1.

The vehicle 10 comprises a hydrogen supply section 11, an oxygen supply section 12, a fuel cell 13, a power control section 14, and a driving section 15.

The hydrogen supply section 11, which stores a hydrogen fuel that may be supplied at a predetermined hydrogen supplying station or the like, supplies a necessary amount of hydrogen to the fuel cell 13 at the time of power generation. The hydrogen fuel stored in the hydrogen supply section 11 may be a high-pressure hydrogen gas at a pressure in the range of 30 to 70 MPa, a hydrogen occlusion alloy (e.g., a Mg or Ti alloy), or liquid hydrogen. The oxygen supply section 12 takes in the air which is present outside of the vehicle, and supplies a necessary amount of oxygen to the fuel cell 13 at the time of power generation. Note that the oxygen supply section 12 may be an oxygen cylinder storing the oxygen fuel. The fuel cell 13 subjects the supplied hydrogen and oxygen to an electrochemical reaction to generate DC electric power, and outputs the generated electric power to the power control section 14. The most preferable form of the fuel cell 13 is a solid polymer. The fuel cell 13 supplies the water which is produced through power generation to a water recovery section 21 of the mobile unit 20 via the joint section 30, and supplies the heat which is produced through power generation to a heat recovery section 22 of the mobile unit 20 via the joint section 30. The power control section 14 converts the DC electric power which is provided from the fuel cell 13 to AC electric power by means of a DC/DC converter and a DC/AC inverter (not shown), and supplies the AC electric power to the driving section 15. The power control section 14 monitors an amount of power stored in a storage battery 23 of the mobile unit 20, and ensures that, if the amount of stored power in the storage battery 23 decreases, the storage battery 23 is recharged with a portion of the DC electric power provided from the fuel cell 13.

The mobile unit 20 comprises the water recovery section 21, the heat recovery section 22, the storage battery 23, a voltage conversion section 24, a water tank 25, a water discharging section 26, and a heating section 27. The water recovery section 21, the heat recovery section 22, and the water tank 25 constitute a heat storing section. The storage battery 23 and the voltage conversion section 24 constitute an electricity storing section.

The water recovery section 21 recovers the water which is generated in the fuel cell 13 via the joint section 30. The water recovery section 21 condenses the water vapor which is discharged from the fuel cell 13, thereby allowing the vapor to be recovered in the form of water. The heat recovery section 22 recovers the heat which is generated in the fuel cell 13 via the joint section 30. Through a heat exchange process, the heat recovered by the heat recovery section 22 is stored into the water (as a heat storing material) which has been recovered by the water recovery section 21. In other words, the water which has been recovered by the water recovery section 21 is warmed up. The water having been warm up is stored in the water tank 25, so as to be used for controlling the temperature of the mobile unit 20 or as hot water to be supplied to the kitchen or the bathroom. The water recovery section 21 monitors the amount of stored hot water in the water tank 25, and ensures that, if the water tank 25 is full, the hot water is discharged out of the car via the water discharging section 26. The DC electric power stored in the storage battery 23 is converted to a necessary voltage format by the voltage conversion section 24, which may be composed of a DC/DC converter and/or a DC/AC inverter (not shown), and supplied onto the electric wiring within the mobile unit 20. The heating section 27 is employed, as necessary, to further heat the hot water stored in the water tank 25 upon use.

The joint section 30 joints the vehicle 10 and the mobile unit 20 in such a manner that the vehicle 10 can travel while trailing the mobile unit 20. Moreover, the joint section 30 connects the power control section 14 to the storage battery 23 so as to allow the power generated by the fuel cell 13 of the vehicle 10 to be supplied to the mobile unit 20, and connects the fuel cell 13 to the water recovery section 21 and the heat recovery section 22 so as to allow the water and heat produced through power generation to be supplied to the mobile unit 20. The joint section 30 has a structure which allows the vehicle 10 and the mobile unit 20 to be easily disconnected from each other, thereby permitting the vehicle 10 to travel by itself. In this case, the joint section 30 may be an independent component, or an integral part of either the vehicle 10 or the mobile unit 20.

Next, the operation performed by the cogeneration vehicle system according to the first embodiment, in which the vehicle 10 and the mobile unit 20 are jointed by the joint section 30 as described above, will be specifically described.

When not travelling, the vehicle 10 recharges the storage battery 23 of the mobile unit 20 with the electric power generated by the fuel cell 13, via the power control section 14. Moreover, the vehicle 10 supplies the water and heat which have been produced through power generation to the water recovery section 21 and the heat recovery section 22, respectively. The mobile unit 20 recovers the water and the heat supplied from the vehicle 10, and uses them for room heating and/or for supplying hot water. The vehicle 10 does not need to always generate power when not travelling. If a sufficient amount of power is stored in the storage battery 23, the vehicle 10 may stop power generation, for example.

When commencing motion, the vehicle 10 supplies the electric power generated by the fuel cell 13 to the driving section 15 via the power control section 14. If there is not enough electric power output from the fuel cell 13, the vehicle 10 compensates for the insufficiency with the electric power supplied from the storage battery 23 of the mobile unit 20. Through such control, the acceleration performance when commencing motion can be improved. The vehicle 10 supplies the water and heat which have been produced through power generation to the water recovery section 21 and the heat recovery section 22, respectively. The mobile unit 20 recovers the water and the heat supplied from the vehicle 10, and uses them for room heating and/or for supplying hot water.

When travelling, the vehicle 10 continues supplying the electric power generated by the fuel cell 13 to the driving section 15 via the power control section 14. On the other hand, if the amount of stored power in the storage battery 23 decreases, the vehicle 10 recharges the storage battery 23 with a portion of the electric power. The vehicle 10 supplies the water and heat which have been produced through power generation to the water recovery section 21 and the heat recovery section 22, respectively. The mobile unit 20 recovers the water and the heat supplied from the vehicle 10, and uses them for room heating and/or for supplying hot water.

When braking, the vehicle 10 recharges the storage battery 23 of the mobile unit 20 with the electric power generated by the fuel cell 13, as well as the regenerative electric power which is generated in the driving section 15 when the vehicle is braking, via the power control section 14. Note that the vehicle 10 may stop power generation when braking. The vehicle 10 supplies the water and heat which have been produced through power generation to the water recovery section 21 and the heat recovery section 22, respectively. The mobile unit 20 recovers the water and the heat supplied from the vehicle 10, and uses them for room heating and/or for supplying hot water.

Thus, in accordance with the cogeneration vehicle system of the first embodiment, the vehicle 10 and the mobile unit 20 are capable of travelling while being jointed by the joint section 30. As a result, the water and heat produced by the fuel cell of the vehicle 10 can always be utilized for cogeneration in the mobile unit 20 regardless of whether the vehicle 10 is stationary, commencing motion, in motion, or braking.

Furthermore, the cogeneration vehicle system of the first embodiment is also capable of providing the following control based on the above-described configuration.

As is well known, the fuel cell 13 utilizes power generation through an electrochemical reaction, so that the output of the fuel cell 13 will decrease at lower temperatures. Therefore, in order to start the vehicle 10 to run after the fuel cell 13 has cooled down, it is necessary to observe an idling period during which the temperature of the fuel cell 13 increases to about 40° C. to about 70° C. so that the fuel cell 13 becomes capable of outputting sufficient electric power for the vehicle 10 to commence motion. It may take about three minutes for the vehicle 10 to commence motion. This would also mean that, until sufficient electric power for commencing the motion of the vehicle 10 is obtained, any gadget which constitutes an electric power load, such as a navigation device for acquiring external information, a television set, or an air conditioner for adjusting the temperature within the vehicle 10, cannot be operated.

Therefore, in accordance with the cogeneration vehicle system of the first embodiment, the fuel cell 13 of the vehicle 10 is warmed up by utilizing the heat recovered by the heat recovery section 22 of the mobile unit 20 in order to avoid the aforementioned situation. Specifically, a structure for circulating a predetermined liquid between the fuel cell 13 and the heat recovery section 22 by means of a pump or the like is provided, such that the liquid having been warmed up by the heat recovered by the heat recovery section 22 is allowed to be circulated. Similarly, by providing a circulation path which allows the window panes of the vehicle 10, the air within the vehicle 10, and/or the seats of the vehicle 10 to be warmed up, for example, a pleasant environment can be provided within the vehicle 10 during a start sequence of the vehicle 10, prior to the travelling of the vehicle 10. The liquid to be circulated may be the hot water stored in the water tank 25 of the mobile unit 20, or water containing a cryoprotectant such as ethylene glycol. Since the output of the storage battery 23 of the mobile unit 20 will also decrease at lower temperatures, it is preferable to warm up the storage battery 23 when the temperature is about 0° C. or below.

Although the first embodiment illustrates the case where water is used as the heat storing material for the heat recovery section 22, any heat storing material other than water, e.g., paraffin (suitable for latent heat thermal storage) or calcium carbide (suitable for chemical reaction thermal storage). In the case where a heat storing material other than water is used, a secondary heat exchange process for warming up the water recovered by the water recovery section 21 will be required in order to make hot water available within the mobile unit 20.

Figure 2:
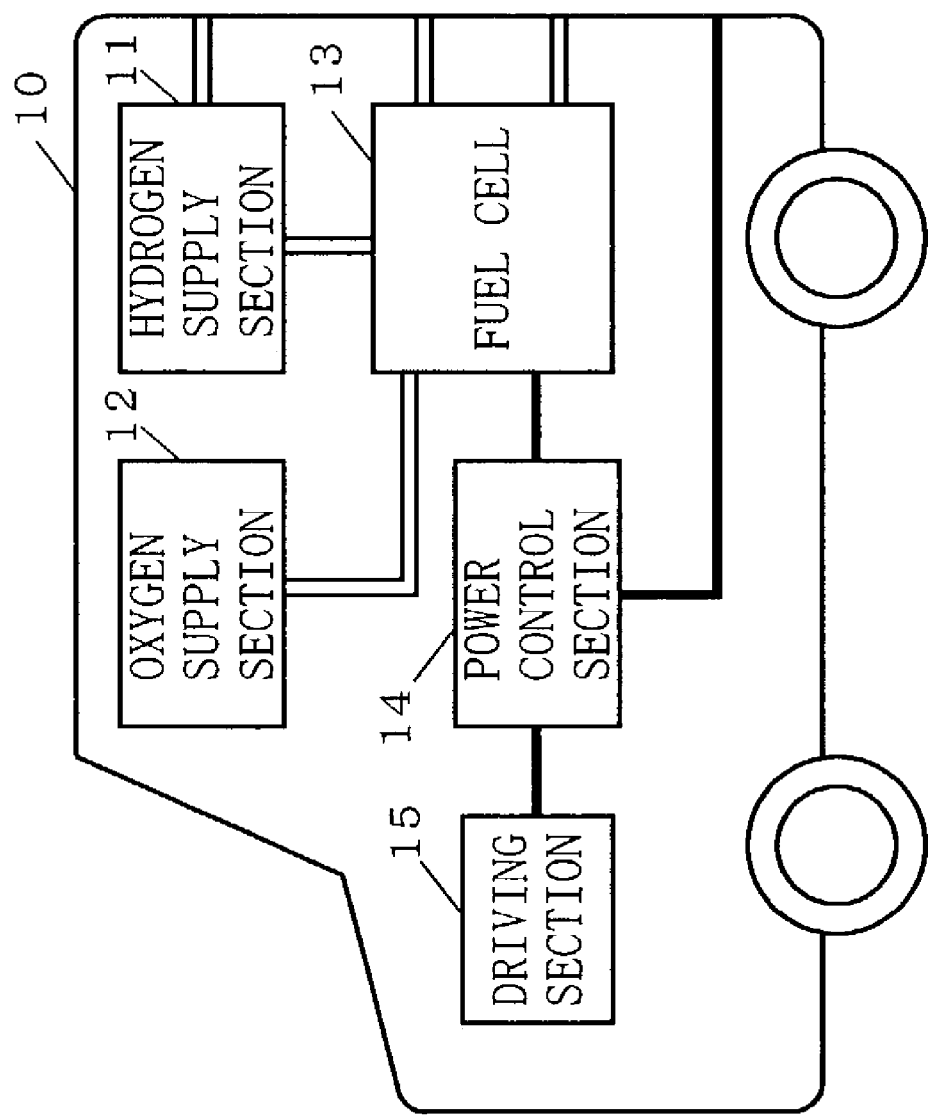
FIG. 2 is a diagram illustrating a vehicle 10 when travelling alone.

Another feature of the cogeneration vehicle system of the first embodiment is the user's ability to choose between a cogeneration operation mode (where the vehicle 10 and the mobile unit 20 are deployed in a jointed state) and a solo operation mode (where the vehicle 10 is detached from the mobile unit 20 so as to be deployed alone (FIG. 2)). In the cogeneration operation mode, the vehicle 10 controls the level of power generation by the fuel cell 13 so as to enable cogeneration within the mobile unit 20. In the solo operation mode, the vehicle 10 controls the level of power generation by the fuel cell 13 so as to enable the travelling of the vehicle 10 by itself.

SECOND EMBODIMENT

Figure 3:
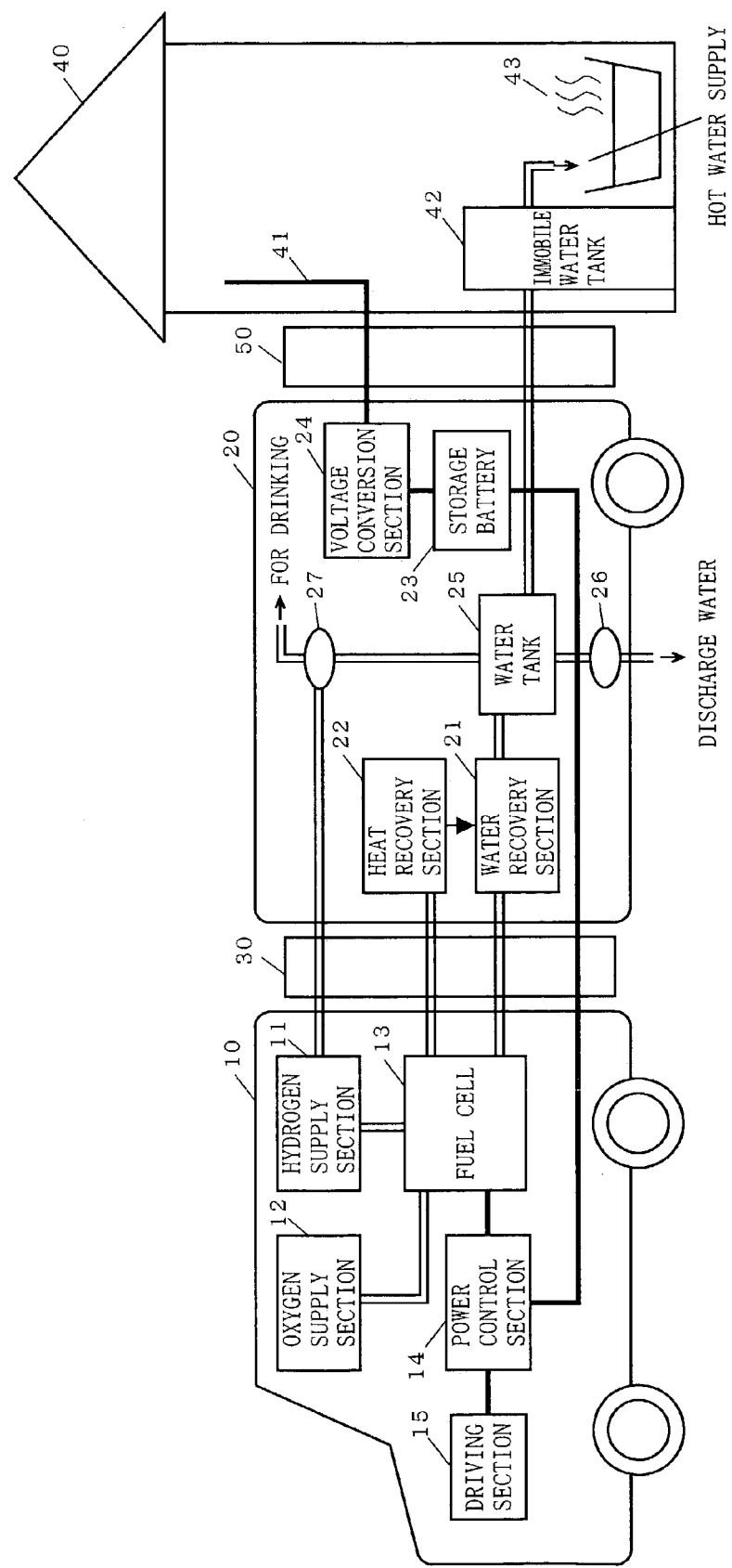
FIG. 3 is a block diagram illustrating the structure of a cogeneration vehicle system according to a second embodiment of the present invention.

FIG. 3 is a block diagram illustrating the structure of a cogeneration vehicle system according to a second embodiment of the present invention. In FIG. 3, the system according to the second embodiment comprises a vehicle 10 incorporating a fuel cell power generator which utilizes hydrogen as a fuel, a mobile unit 20 having a living space, and an immobile facility 40 (such as a residential house). The vehicle 10 and the mobile unit 20 are jointed via a first joint section 30. Furthermore, the mobile unit 20 and the immobile facility 40 are jointed via a second joint section 50. The first joint section 30 joints the vehicle 10 and the mobile unit 20 in such a manner that the mobile unit 20 can be trailed by the vehicle 10 and yet energy provided from the vehicle 10 can be used for cogeneration within the mobile unit 20. The second joint section 50 joints the mobile unit 20 and the immobile facility 40 in such a manner that the energy provided from the mobile unit 20 can be used for cogeneration within the immobile facility 40.

As shown in FIG. 3, the cogeneration vehicle system according to the second embodiment is based on the system according to the first embodiment plus the immobile facility 40 and the second joint section 50. The first joint section 30 according to the second embodiment and the joint section 30 according to the first embodiment are identical in structure.

First, the cogeneration vehicle system according to the second embodiment will be described mainly with respect to these additional elements.

The immobile facility 40 is a residential house or the like for people to live in, and does not move. The immobile facility 40 at least includes internal wiring 41 for supplying electric power, an immobile water tank 42 for storing hot water, and equipment 43 (e.g., a bathroom in the example shown in FIG. 3) which utilizes the hot water stored in the immobile water tank 42.

The second joint section 50 joints the mobile unit 20 and the immobile facility 40. The second joint section 50 connects the voltage conversion section 24 to the internal wiring 41 of the immobile facility 40 so as to allow the electric power stored in the storage battery 23 of the mobile unit 20 to be supplied to the immobile facility 40. The second joint section 50 connects the water tank 25 to the immobile water tank 42 so as to allow the hot water stored in the water tank 25 of the mobile unit 20 to be supplied to the immobile facility 40. The second joint section 50 has a structure which allows the mobile unit 20 and the immobile facility 40 to be easily disconnected from each other, thereby permitting the vehicle 10 and the mobile unit 20 to travel by themselves. In this case, the second joint section 50 may be an independent component, or an integral part of either the mobile unit 20 or the immobile facility 40.

The second joint section 50 may be constructed so as to have a space for allowing people to pass therethrough. Thus, since people can freely come and go between the mobile unit 20 and the immobile facility 40, there is provided an additional effect in that the mobile unit 20 can be utilized as an extension of one's residence. In order to facilitate the trips between the mobile unit 20 and the immobile facility 40, for example, it is preferable that the second joint section 50 is constructed in such a manner as to allow the floor heights of the mobile unit 20 and/or the immobile facility 40 to be adjusted for ensuring that the floor of the immobile facility 40 and the floor of the mobile unit 20 become flush. Such a height adjustment function may be provided on the side of the mobile unit 20 or on the side of the immobile facility 40.

Next, the operation performed by the cogeneration vehicle system according to the second embodiment, in which the vehicle 10, the mobile unit 20, and the immobile facility 40 are jointed via the first joint section 30 and the second joint section 50 as described above, will be specifically described.

Via the power control section 14 and the first joint section 30, the vehicle 10 recharges the storage battery 23 of the mobile unit 20 with the electric power generated by the fuel cell 13. Moreover, via the first joint section 30, the vehicle 10 supplies the water and heat which have been produced through power generation to the water recovery section 21 and the heat recovery section 22, respectively.

The mobile unit 20 recovers the water and the heat supplied from the vehicle 10, and uses them for room heating and/or for supplying hot water. In addition, if the amount of stored power in the storage battery 23 is equal to or greater than a predetermined level, the mobile unit 20 converts a portion of the electric power stored storage battery 23 to a necessary voltage by means of the voltage conversion section 24, and thereafter supplies the electric power to the internal wiring 41 of the immobile facility 40 via the second joint section 50. This can contribute to the minimization of the fluctuation in the loads on the electric power within the immobile facility 40. Furthermore, if the amount of stored hot water in the water tank 25 is equal to or greater than a predetermined level, the mobile unit 20 supplies a portion of the hot water stored in the water tank 25 to the immobile water tank 42 of the immobile facility 40, by means of a pump or the like (not shown), via the second joint section 50.

Thus, in accordance with the cogeneration vehicle system of the second embodiment, the mobile unit 20 and the immobile facility 40 are jointed via the second joint section 50. As a result, the water and heat produced through the fuel cell power generation in the vehicle 10 can be supplied not only to the mobile unit 20 but also to the immobile facility 40 for cogeneration. In particular, the energy (water, heat, and electric power) stored in the mobile unit 20 during the running of the vehicle 10 can be reused in the immobile facility 40 after it returns to the immobile facility 40, whereby a substantial energy saving effect can be provided.

Furthermore, the cogeneration vehicle system of the second embodiment is also capable of providing the following control based on the above-described configuration.

As described in the first embodiment, the fuel cell 13 needs to be warmed up during a start sequence of the vehicle 10. However, hot water may not be present in the water tank 25 of the mobile unit 20. In such a case, the hot water in the immobile water tank 42 of the immobile facility 40 can be supplied back to the water tank 25 of the mobile unit 20. Assuming that the immobile water tank 42 of the immobile facility 40 has a higher ability to keep hot water than does the water tank 25, all of the hot water stored in the water tank 25 may be moved to the immobile water tank 42 when the running of the vehicle 10 is over, even in the case where some hot water is contained in the water tank 25 of the mobile unit 20. Thereafter, when the vehicle 10 is run the next time, the hot water may be moved back from the immobile water tank 42 to the water tank 25. As a result, a high heat utilization efficiency can be realized.

The second embodiment illustrates an example where the storage battery 23 of the mobile unit 20 is recharged with the power generated by the fuel cell 13 of the vehicle 10. However, the unit price of electric power generated by using hydrogen is currently higher than the unit price of electric power commercially provided from power generating companies. Therefore, when the vehicle 10, the mobile unit 20, and the immobile facility 40 are jointed, it is more economically advantageous to recharge the storage battery 23 of the mobile unit 20 with the commercial electric power which is available in the immobile facility 40, thereby reducing the consumption of the hydrogen fuel within the vehicle 10.

Moreover, by arranging the system so that a pipe (not shown) for supplying a hydrogen fuel to the hydrogen supply section 11 of the vehicle 10 can be jointed to the immobile facility 40 via the first joint section 30 and the second joint section 50, it becomes possible to supply the hydrogen fuel from the immobile facility 40 to the hydrogen supply section 11 when they are jointed.

Another feature of the cogeneration vehicle system of the second embodiment is the user's ability to choose between, in addition to a cogeneration operation mode and a solo operation mode as described in conjunction with the first embodiment, a second cogeneration operation mode (where the vehicle 10, the mobile unit 20, and the immobile facility 40 are deployed in a jointed state), and a third cogeneration operation mode (where only the mobile unit 20 is jointed to the immobile facility 40). In the second cogeneration operation mode, the vehicle 10 controls the level of power generation by the fuel cell 13 so as to enable cogeneration within the mobile unit 20 and the immobile facility 40. In the third cogeneration operation mode, the vehicle 10 performs a control similar to that under the solo operation mode.

THIRD EMBODIMENT

Next, specific methods for utilizing the water and heat produced in the cogeneration vehicle system (hereinafter referred to as the "produced water" and the "produced heat", respectively) according to the first and second embodiments will be described.

As described earlier, power generation by the fuel cell 13 occurs through a reaction which is a reversal of electrolysis of water, using hydrogen and oxygen as fuels. Therefore, the fuels which have been used for the power generation all emerge as a large quantity of produced water. Moreover, a great amount of heat is also produced through the power generation by the fuel cell 13. By warming up the produced water by the produced heat, it is possible to obtain water which is hot enough for use in the kitchen or as bathing water. This hot water can also be used for room-heating purposes.

On the other hand, if the oxygen fuel supplied to the fuel cell 13 is clean, highly pure and drinkable water can be produced through the power generation by the fuel cell 13. By warming up the produced drinkable water with the heat produced through power generation, it will become possible to obtain hot water which is sufficient for making coffee, for example.

However, the fuel cell 13 mounted in an actual vehicle will utilize oxygen which is contained in the atmosphere for power generation. Therefore, dust and/or hazardous matter which are present in the atmosphere may stray into the produced water, thereby contaminating the produced water so as not to be drinkable. In order to prevent this, ion exchange resin- or activated carbon absorbent-based filters may be employed to purify the air which is supplied to the fuel cell, thereby preventing dust and hazardous matter from straying into the produced water. This method is considered the most practical because the method not only helps clean water to be produced, but also prevents the contamination of the fuel cell 13.

When hot water is stored in the water tank 25 of the mobile unit 20, various bacteria contained in the hot water may rapidly increase through a proliferation process at about 50° C. or below. On the other hand, at 0° C. or any lower temperature, water will freeze and possibly destroy the water tank 25.

Therefore, it is preferable to utilize the water discharging section 26 provided in the water tank 25 to provide a discharging control as follows. In the case where the hot water stored in the water tank 25 is intended for drinking, the hot water stored in the water tank 25 may be controlled to be discharged out of the mobile unit 20 if the water temperature is equal to or less than about 50° C., whereby decomposition of the water can be prevented. In the case where the hot water stored in the water tank 25 is for purposes other than drinking, the water stored in the water tank 25 may be controlled to be discharged out of the mobile unit 20 before the water temperature decreases to about 0° C., whereby the destruction of the water tank 25 due to the freezing of the water can be prevented. Furthermore, it is preferable to apply water-repellent surface processing to the internal surface of the water tank 25 using fluorine. Such processing will lead to a better discharging of water.

The heat produced by the fuel cell 13 is about 70° C., which is not high enough for preparing decent coffee.

Therefore, it is preferable to heat the hot water to an optimum temperature (e.g., 90° C. or above) at the heating section 27, which is provided at a point between the water tank 25 and a tap from which to supply hot water for drinking. The most suitable form of the heating section 27 is a hydrogen burner which can utilize the hydrogen fuel stored in the hydrogen supply section 11 of the vehicle 10. When hot water for drinking is desired, the hot water stored in the water tank 25 is heated by such a hydrogen burner to a necessary temperature. The hydrogen burner preferably utilizes catalytic combustion, which involves reacting hydrogen at room temperature. Hydrogen catalytic combustion is highly reliable because it does not create flames, and does not require any ignition equipment.

Thus, in accordance with the cogeneration vehicle system of the present invention, the vehicle 10 (incorporating a fuel cell power generator) and the mobile unit 20 (comprising the storage battery 23 and the water tank 25) can be jointed so as to work in cooperation and move together. As a result, energy can be exchanged between the vehicle 10 and the mobile unit 20 even during a travel. In other words, the water and heat produced through fuel cell power generation and the excess electric power can be effectively utilized for cogeneration within the mobile unit 20, even during the travel of the vehicle 10. Thus, the cogeneration vehicle system of the present invention provides a higher cogeneration efficiency than conventional systems (e.g., trailer houses), and is low-pollution, low-noise, and environmentally friendly. Moreover, cogenerative use of a fuel cell power generator, which has conventionally been possible only within a stationary building, can be realized at any arbitrary destination according to the present invention.

Moreover, in accordance with the cogeneration vehicle system of the present invention, the mobile unit 20 which is jointed to the vehicle 10 can be further jointed to the immobile facility 40 comprising the internal wiring 41 and the immobile water tank 42, so that energy can be exchanged between the mobile unit 20 and the immobile facility 40. Specifically, the water and heat produced during the travel of the vehicle 10 and any excess electric power can be stored in the mobile unit 20, so as to be later utilized for cogeneration within the immobile facility 40. Moreover, since the electric power stored in the storage battery 23 of the mobile unit 20 can be used together with the commercial electric power which is available in the immobile facility 40, it is possible to use the storage battery 23 as a load fluctuation-absorbing power source capable of providing a peak-cut effect, or as an emergency power source in times of power failure. Since the hot water in the immobile water tank 42 of the immobile facility 40 can be supplemented with the water in the water tank 25 of the mobile unit 20, it is possible to downsize the immobile water tank 42.

Since the vehicle 10, the mobile unit 20, and the immobile facility 40 can be freely jointed to or disjointed from one another, the user can select an optimum operation mode depending on the desired driving pattern.

If the amount of stored power in the storage battery 23 of the mobile unit 20 is not adequate while the mobile unit 20 is jointed to the immobile facility 40, the storage battery 23 can be recharged with the commercial electric power which is available in the immobile facility 40. As a result, the hydrogen fuel consumption by the vehicle 10 can be reduced.

Moreover, it is possible to use the hot water in the water tank 25 or the immobile water tank 42 for warming up the fuel cell 13 of the vehicle 10 and/or the storage battery 23 of the mobile unit 20, and/or providing room heating within the vehicle before beginning a travel.

Furthermore, when sufficiently clean hydrogen and oxygen are used as fuels, the water-produced by the fuel cell 13 can be used for drinking.

While the invention has been described in detail, the foregoing description is in all aspects illustrative and not restrictive. It is understood that numerous other modifications and variations can be devised without departing from the scope of the invention.

What is claimed is:

1. A cogeneration vehicle system using a fuel cell car, said cogeneration vehicle system comprising:
   a vehicle including a fuel cell for generating electric power by using hydrogen as a fuel and a hydrogen supply section for storing the hydrogen fuel; and
   a mobile unit including a space and equipment to be used by a user, the mobile unit being jointed to the vehicle so as to be capable of traveling while being trailed by and exchanging energy with the vehicle,
   wherein the mobile unit further includes:
      a heat storing section for recovering heat produced through the power generation by the fuel cell from the vehicle, heating predetermined water with the recovered heat, and storing the heated predetermined water in a water tank; and
      an electricity storing section for recovering, from the vehicle, excess electric power which is generated through the power generation by the fuel cell but not needed for running the vehicle, and storing the excess electric power in a storage battery.
   wherein the energy which is generated by the fuel cell but not used for running the vehicle is stored in the mobile unit, and used by the equipment in the mobile unit,
   wherein the heat storing section recovers water produced through the power generation by the fuel cell from the vehicle, and uses the water as the predetermined water, and
   wherein the vehicle further includes a filter for removing dust and hazardous matter, and supplies oxygen extracted from air which has been passed through the filter to the fuel cell.

2. The cogeneration vehicle system according to claim 1, wherein the heated predetermined water stored in the heat storing section is supplied to hot-water supplying equipment in the mobile unit, and the electric power stored in the electricity storing section is supplied to electric equipment in the mobile unit.

3. The cogeneration vehicle system according to claim 1, wherein
if the electric power which is generated through the power generation by the fuel cell is smaller than a level of electric power which is necessary for running the vehicle, the electric power stored in the storage battery in the mobile unit is supplied to the vehicle.

4. The cogeneration vehicle system according to claim 1, wherein, in a start sequence of the vehicle, the heat stored in the heat storing section in the mobile unit is used to warm up at least one of the fuel cell in the vehicle or the storage battery in the mobile unit.

5. The cogeneration vehicle system according to claim 1, wherein, in a start sequence of the vehicle, the heat stored in the heat storing section in the mobile unit is used to warm up at least one of a window pane, internal air, and a seat of the vehicle.

6. The cogeneration vehicle system according to claim 1, wherein the mobile unit further comprises a heating section for heating the heated predetermined water stored in the water tank by using catalytic combustion of the hydrogen fuel stored in the vehicle.

7. The cogeneration vehicle system according to claim 1, wherein the vehicle and the mobile unit are capable of being disjointed from each other, and when the vehicle and the mobile unit are disjointed from each other, the vehicle is capable of travelling alone by using the electric power generated by the fuel cell.

8. A cogeneration vehicle system using a fuel cell car, said cogeneration vehicle system comprising:
a vehicle including a fuel cell for generating electric power by using hydrogen as a fuel and a hydrogen supply section for storing the hydrogen fuel; and
a mobile unit including a space and equipment to be used by a user, the mobile unit being jointed to the vehicle so as to be capable of traveling while being trailed by and exchanging energy with the vehicle,
wherein the mobile unit further includes:
a heat storing section for recovering heat produced through the power generation by the fuel cell from the vehicle, heating predetermined water with the recovered heat, and storing the heated predetermined water in a water tank; and
an electricity storing section for recovering, from the vehicle, excess electric power which is generated through the power generation by the fuel cell but not needed for running the vehicle, and storing the excess electric power in a storage battery,
wherein the energy which is generated by the fuel cell but not used for running the vehicle is stored in the mobile unit, and used by the equipment in the mobile unit,
wherein when the heated predetermined water stored in the water tank is to be used for drinking, the mobile unit discharges the heated predetermined water out of the mobile unit if the heated predetermined water is cooled to about 50° C. or lower, and
wherein when the heated predetermined water stored in the water tank is to be used for a purpose other than drinking, the mobile unit discharges the heated predetermined water out of the mobile unit before the heated predetermined water is cooled to about 0° C.

9. The cogeneration vehicle system according to claim 8, wherein the heated predetermined water stored in the heat storing section is supplied to hot-water supplying equipment in the mobile unit, and the electric power stored in the electricity storing section is supplied to electric equipment in the mobile unit.

10. The cogeneration vehicle system according to claim 8, wherein
if the electric power which is generated through the power generation by the fuel cell is smaller than a level of electric power which is necessary for running the vehicle, the electric power stored in the storage battery in the mobile unit is supplied to the vehicle.

11. The cogeneration vehicle system according to claim 8, wherein, in a start sequence of the vehicle, the heat stored in the heat storing section in the mobile unit is used to warm up at least one of the fuel cell in the vehicle or the storage battery in the mobile unit.

12. The cogeneration vehicle system according to claim 8, wherein, in a start sequence of the vehicle, the heat stored in the heat storing section in the mobile unit is used to warm up at least one of a window pane, internal air, and a seat of the vehicle.

13. The cogeneration vehicle system according to claim 8, wherein the mobile unit further comprises a heating section for heating the heated predetermined water stored in the water tank by using catalytic combustion of the hydrogen fuel stored in the vehicle.

14. The cogeneration vehicle system according to claim 8, wherein the vehicle and the mobile unit are capable of being disjointed from each other, and when the vehicle and the mobile unit are disjointed from each other, the vehicle is capable of travelling alone by using the electric power generated by the fuel cell.

* * * * *